United States Patent
Hakkaku et al.

(10) Patent No.: US 10,538,038 B2
(45) Date of Patent: Jan. 21, 2020

(54) INKJET FORMING METHOD

(71) Applicant: MIMAKI ENGINEERING CO., LTD., Nagano (JP)

(72) Inventors: Kunio Hakkaku, Nagano (JP); Hiroyoshi Ohi, Nagano (JP); Masaya Nagahari, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 183 days.

(21) Appl. No.: 15/241,090

(22) Filed: Aug. 19, 2016

(65) Prior Publication Data

US 2017/0050385 A1    Feb. 23, 2017

(30) Foreign Application Priority Data

Aug. 21, 2015  (JP) .................... 2015-163662

(51) Int. Cl.
*B29C 67/00* (2017.01)
*B33Y 10/00* (2015.01)
(Continued)

(52) U.S. Cl.
CPC ........ *B29C 67/0092* (2013.01); *B29C 64/112* (2017.08); *B33Y 10/00* (2014.12); *B41J 2/015* (2013.01); *B29C 64/40* (2017.08)

(58) Field of Classification Search
CPC ... B29C 64/112; B29C 67/0059; B29C 64/40; B29C 67/0092; B41J 2/015; B33Y 10/00
See application file for complete search history.

(56) References Cited

U.S. PATENT DOCUMENTS 6,612,824 B2 * 9/2003 Tochimoto ............. B29C 41/36
                                                         425/130
10,065,376 B2 * 9/2018 Hakkaku ................ B33Y 80/00
(Continued)

FOREIGN PATENT DOCUMENTS

JP    2012111226    6/2012
JP    2015071282    4/2015
(Continued)

OTHER PUBLICATIONS

"Search Report of Europe Counterpart Application", dated Dec. 13, 2016, p. 1-p. 7, in which the listed references were cited.
(Continued)

*Primary Examiner* — Anthony Calandra
*Assistant Examiner* — Jerzi H Moreno Hernandez
(74) *Attorney, Agent, or Firm* — JCIPRNET

(57) ABSTRACT

An inkjet forming method is provided and is a three-dimensional object forming method for forming a three-dimensional object in which a target object and a removable portion are integrally formed by vertically stacking a plurality of forming layers in a vertical direction. The inkjet forming method includes: forming the forming layer to include a target layer to be the target object after shaping and a removable layer to be the removable portion after shaping; with respect to the forming layers being vertically stacked in the vertical direction, forming the removable layer to be arranged at an outside of the target layer, and forming an outer contour of the removable layer disposed at a lower side outward than an outer contour of the removable layer disposed at an upper side; and during forming the forming layers, forming the target layer and the removable layer simultaneously with ink droplets ejected by an inkjet printing.

4 Claims, 9 Drawing Sheets

(51) Int. Cl.
*B41J 2/15* (2006.01)
*B29C 64/112* (2017.01)
*B41J 2/015* (2006.01)
*B29C 64/40* (2017.01)

(56) References Cited

U.S. PATENT DOCUMENTS

| | | | | |
|---|---|---|---|---|
| 2004/0175451 | A1* | 9/2004 | Maekawa | B29C 41/36 425/144 |
| 2004/0187714 | A1* | 9/2004 | Napadensky | B29C 41/48 101/35 |
| 2005/0069784 | A1* | 3/2005 | Gothait | B33Y 70/00 430/5 |
| 2014/0162033 | A1* | 6/2014 | Giller | B29C 64/135 428/207 |
| 2015/0190964 | A1* | 7/2015 | Okamoto | B29C 67/0092 428/192 |
| 2015/0190965 | A1* | 7/2015 | Okamoto | B29C 64/40 428/195.1 |
| 2015/0266240 | A1* | 9/2015 | Okamoto | B29C 64/20 428/413 |
| 2017/0066198 | A1* | 3/2017 | Ur | B33Y 10/00 |
| 2017/0239886 | A1* | 8/2017 | Norikane | B33Y 10/00 |

FOREIGN PATENT DOCUMENTS

| | | |
|---|---|---|
| JP | 2015136895 | 7/2015 |
| WO | 2013167528 | 11/2013 |
| WO | 2015111366 | 7/2015 |
| WO | 2015119130 | 8/2015 |

OTHER PUBLICATIONS

"Office Action of Japan Counterpart Application," with English translation thereof, dated Aug. 28, 2019, pp. 1-8.

* cited by examiner

INKJET FORMING METHOD

CROSS REFERENCE TO RELATED APPLICATIONS

This application claims the priority benefit of Japanese Patent Application No. 2015-163662, filed on Aug. 21, 2015. The entirety of the above-mentioned patent application is hereby incorporated by reference herein and made a part of this specification.

TECHNICAL FIELD

This disclosure relates to an inkjet forming method for manufacturing a three-dimensional object using inkjet printing.

DESCRIPTION OF THE BACKGROUND ART

There have been disclosed inkjet forming methods for manufacturing three-dimensional objects by vertically stacking a plurality of horizontally extending layers formed of ink droplets discharged by inkjet printing through nozzles of an inkjet head (for example, see Patent Literature 1: JP 2015-071282 A).

Patent Literature 1: JP 2015-071282 A

SUMMARY

The inventors of this application recognized that the conventional inkjet forming methods had thus far not succeeded in obtaining three-dimensional objects shaped as originally intended. The inventors tried to determine through keen studies what caused the shapes of the three-dimensional objects to differ from targeted shapes and finally found the causation. When a layer is formed (hereinafter, "target layer") so as to have its horizontal contour be vertically contiguous with the horizontal contour of another layer vertically immediately below the target layer (hereinafter, immediate underlayer), ink droplets discharged to form the horizontal contour of the target layer may fail to land on the immediate underlayer, falling vertically downward beyond the immediate underlayer. This failure of ink droplets landing at correct positions incurs shape errors of three-dimensional objects.

The inventors of this application further looked into what could have affected the accuracy of the horizontal landing positions of ink droplets, and determined at least three factors. Firstly, it is positional inaccuracy of an inkjet head due to a mechanism employed to horizontally drive the inkjet head. If the position of the inkjet head in the horizontal direction is not as accurate as required, the ink droplet landing positions in the horizontal direction may also be poorly accurate. Secondly, it is inaccuracy of angles at which ink droplets are discharged through each nozzle of the inkjet head. If the accuracy of angles at which ink droplets are discharged is variable from one nozzle to another in the inkjet head, the ink droplet landing positions in the horizontal direction may be accordingly variable in accuracy. Thirdly, it is airflow provoked by changing vertical intervals between the inkjet head and the three-dimensional object when the inkjet head is moved in the horizontal direction. The airflow may affect the flight of ink droplets discharged from the inkjet head, adversely affecting the accuracy of the ink droplet landing positions in the horizontal direction.

This disclosure is directed to providing an inkjet forming method that may improve the shape accuracy of a three-dimensional object as compared to the conventional methods.

An inkjet forming method disclosed herein manufactures a three-dimensional object by vertically stacking a plurality of layers in a vertical direction, and the plurality of layers is horizontally extended in a horizontal direction and formed of ink droplets discharged by inkjet printing. This inkjet forming method is further characterized as described below. The three-dimensional object includes a target object, and a removable portion formed in contiguity with the target object and removed after the three-dimensional object is manufactured. The removable portion in each of the layers in an overhang region of the target object has: an outer wall in which vertically lower ones of the layers consistently project more outward than vertically upper ones of the layers in the vertical direction.

In the layers in the overhang region of the target object, vertically lower ones of the layers constituting the outer wall of the removable portion consistently project more outward than vertically upper ones of the layers. In case ink droplets discharged to form a target layer fail to land on a target position in the horizontal direction, the inkjet forming method may prevent that the ink droplets discharged to form the contour of the target layer in the horizontal direction does not land on another layer immediately below the target layer but falls vertically further downward. The inkjet forming method disclosed herein may improve the shape accuracy of a three-dimensional object to be formed as compared to the conventional forming methods. According to the inkjet forming method thus improving the shape accuracy of a three-dimensional object to be formed, the target object obtained after the removable portion is removed from the three-dimensional object may be very accurately manufactured.

An inkjet forming method disclosed herein manufactures a three-dimensional object by vertically stacking a plurality layers in a vertical direction, and the plurality of layers is horizontally extended in a horizontal direction and formed of ink droplets discharged by inkjet printing. This inkjet forming method is further characterized as described below. The three-dimensional object includes a target object, and a removable portion formed in contiguity with the target object and removed after the three-dimensional object is manufactured. At least a partial contour of the target object in the horizontal direction in any one of the layers is contiguous with the removable portion in the layer and is vertically contiguous with the target object in another one of the layers immediately above and vertically contiguous with the layer. At least a part of the removable portion forms at least a partial contour of any one of the layers in the horizontal direction. When a target layer among the layers is formed by the inkjet forming method, an entirety of the target layer and an entire contour of the target layer in the horizontal direction are vertically contiguous with an inner part of an immediate underlayer that is located inward of a contour of the immediate underlayer in the horizontal direction. The immediate underlayer is another one of the layers immediately below and vertically contiguous with the target layer.

When a target layer is formed by the inkjet forming method, an entirety of the target layer and an entire contour of the target layer in the horizontal direction are vertically contiguous with an inner part of another layer immediately below and vertically contiguous with the target layer. In case ink droplets discharged to form the target layer fail to land on a target position in the horizontal direction, the inkjet forming method may prevent that the ink droplets discharged to form the contour of the target layer in the horizontal direction does not land on the immediate underlayer but falls vertically further downward. The inkjet forming method disclosed herein may improve the shape accuracy of a three-dimensional object to be formed as compared to the conventional forming methods. According to the inkjet forming method thus improving the shape accuracy of a three-dimensional object to be formed, the target object obtained after the removable portion is removed from the three-dimensional object may be very accurately manufactured.

An inkjet forming method disclosed herein manufactures a three-dimensional object by vertically stacking a plurality layers in a vertical direction, and the plurality of layers is horizontally extended in a horizontal direction and formed of ink droplets discharged by inkjet printing. This inkjet forming method is further characterized as described below. The three-dimensional object includes a target object, and a transparent portion contiguous with the target object. The transparent portion in each of the layers in the overhang region of the target object has: an outer wall in which vertically lower ones of the layers consistently project more outward than vertically upper ones of the layers in the vertical direction.

In the layers in the overhang region of the target object, vertically lower ones of the layers constituting the outer wall of the transparent portion consistently project more outward than vertically upper ones of the layers. In case ink droplets discharged to form a target layer fail to land on a target position in the horizontal direction, the inkjet forming method thus characterized may prevent that the ink droplets discharged to form the contour of the target layer in the horizontal direction does not land on another layer immediately below the target layer but falls vertically further downward. The inkjet forming method disclosed herein may improve the shape accuracy of a three-dimensional object to be formed as compared to the conventional forming methods. The inkjet forming method may thus improve the shape accuracy of a three-dimensional object to be formed and is free from the labor of removing the removable portion. This method, therefore, may facilitate the manufacturing of a highly accurate target object.

An inkjet forming method disclosed herein manufactures a three-dimensional object by vertically stacking a plurality of layers in a vertical direction, and the plurality of layers is horizontally extended in a horizontal direction and formed of ink droplets discharged by inkjet printing. This inkjet forming method is further characterized as described below. The three-dimensional object includes a target object, and a transparent portion contiguous with the target object. At least a partial contour of the target object in the horizontal direction in any one of the layers is contiguous with the transparent portion in the layer and is vertically contiguous with the target object in another one of the layers immediately above and vertically contiguous with the layer immediately above. At least a part of the transparent portion forms at least a partial contour of any one of the layers in the horizontal direction. When a target layer among the layers is formed by the inkjet forming method, an entirety of the target layer and an entire contour of the target layer in the horizontal direction are vertically contiguous with an inner part of an immediate underlayer that is located inward of a contour of the immediate underlayer in the horizontal direction. The immediate underlayer is another one of the layers immediately below and vertically contiguous with the target layer.

When a target layer is formed by the inkjet forming method, entirety of the target layer and an entire contour of the target layer in the horizontal direction are vertically contiguous with an inner part of another layer immediately below and vertically contiguous with the target layer. In case ink droplets discharged to form the target layer fail to land on a target position in the horizontal direction, the inkjet forming method may prevent that the ink droplets discharged to form the contour of the target layer in the horizontal direction does not land on the immediate underlayer but falls vertically further downward. The inkjet forming method disclosed herein may improve the shape accuracy of a three-dimensional object to be formed as compared to the conventional forming methods. The inkjet forming method may thus improve the shape accuracy of a three-dimensional object to be formed and is free from the labor of removing the removable portion. This method, therefore, may facilitate the manufacturing of a highly accurate target object.

In the inkjet forming method disclosed herein, a gradient defined by an end part that forms a contour in the horizontal direction of one of the layers and an end part that forms a contour in the horizontal direction of another one of the layers immediately above and vertically contiguous with the one of the layers may be calculated from a horizontal distance and a vertical distance equal to or less than 100-fold of the horizontal distance. For example, the gradient may be defined as the value obtained by dividing the height of the upper of two adjacent layers by a length in horizontal direction by which the lower of the two layers projects beyond the upper of the two layers at a given location, and this value is preferably not greater than 100.

The inkjet forming method disclosed herein may improve the shape accuracy of a three-dimensional object to be formed as compared to the conventional forming methods.

DETAILED DESCRIPTION OF EMBODIMENTS

An embodiment of this disclosure is hereinafter described referring to the accompanying drawings.

The description given below starts with the structure of an inkjet printer according to the embodiment.

Figure 1:
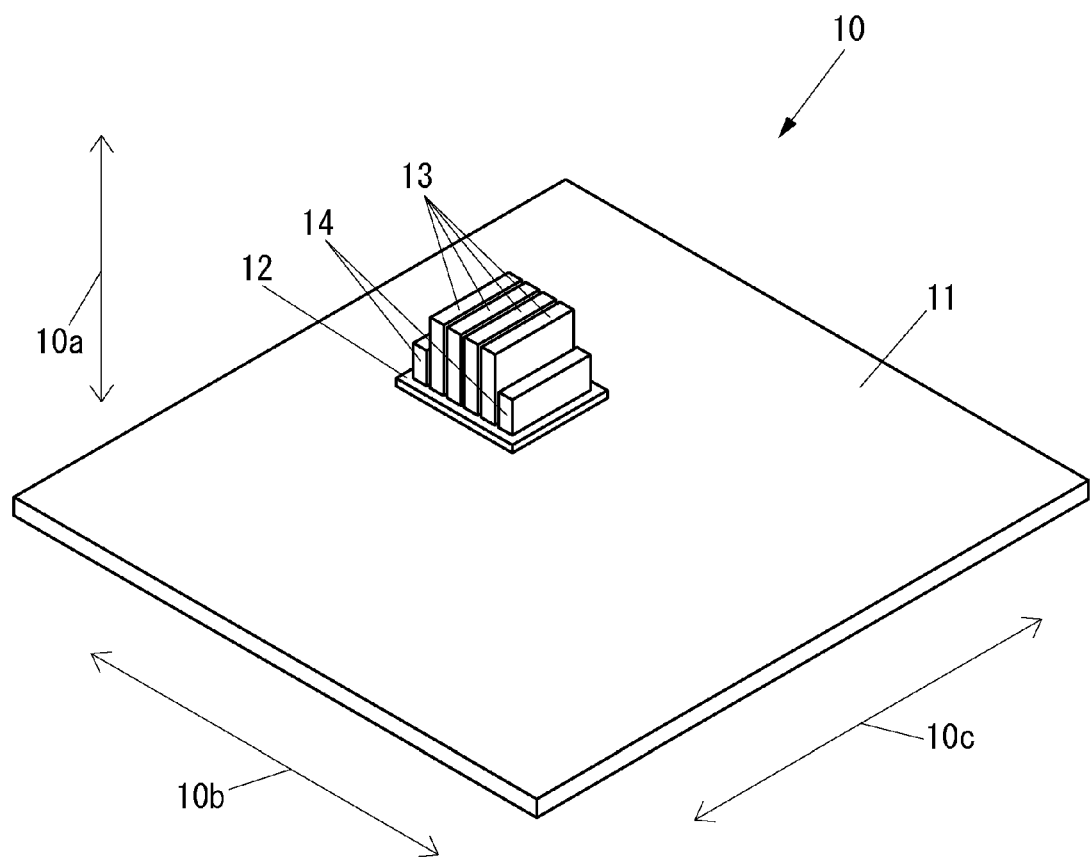
FIG. 1 is a schematic front, upper-right view of an inkjet printer according to an embodiment of this disclosure.

FIG. 1 is a schematic front, upper-right view of an inkjet printer 10 according to the embodiment.

As illustrated in FIG. 1, the inkjet printer 10 has a forming table 11 that supports a three-dimensional object to be formed by inkjet printing, a carriage 12 disposed above the forming table 11 in the direction of gravity, i.e., vertical direction, illustrated with an arrow 10a, a plurality of inkjet heads 13 mounted in the carriage 12, and ultraviolet irradiation devices 14 mounted in the carriage 12. The inkjet heads 13 discharge ink droplets of ultraviolet (UV) inks vertically downward, and the ultraviolet irradiation devices 14 emit ultraviolet light vertically downward. The carriage 12 has a flattening roller not illustrated in the drawing. The flattening roller uniforms the vertical dimension of a three-dimensional object currently formed on the forming table 11.

The inkjet heads 13 are respectively connected to different ink tanks not illustrated in the drawing and supplied with inks from the ink tanks. The ink droplets discharged from the inkjet heads 13 may have the diameter of, for example, 40 μm.

Figure 2:
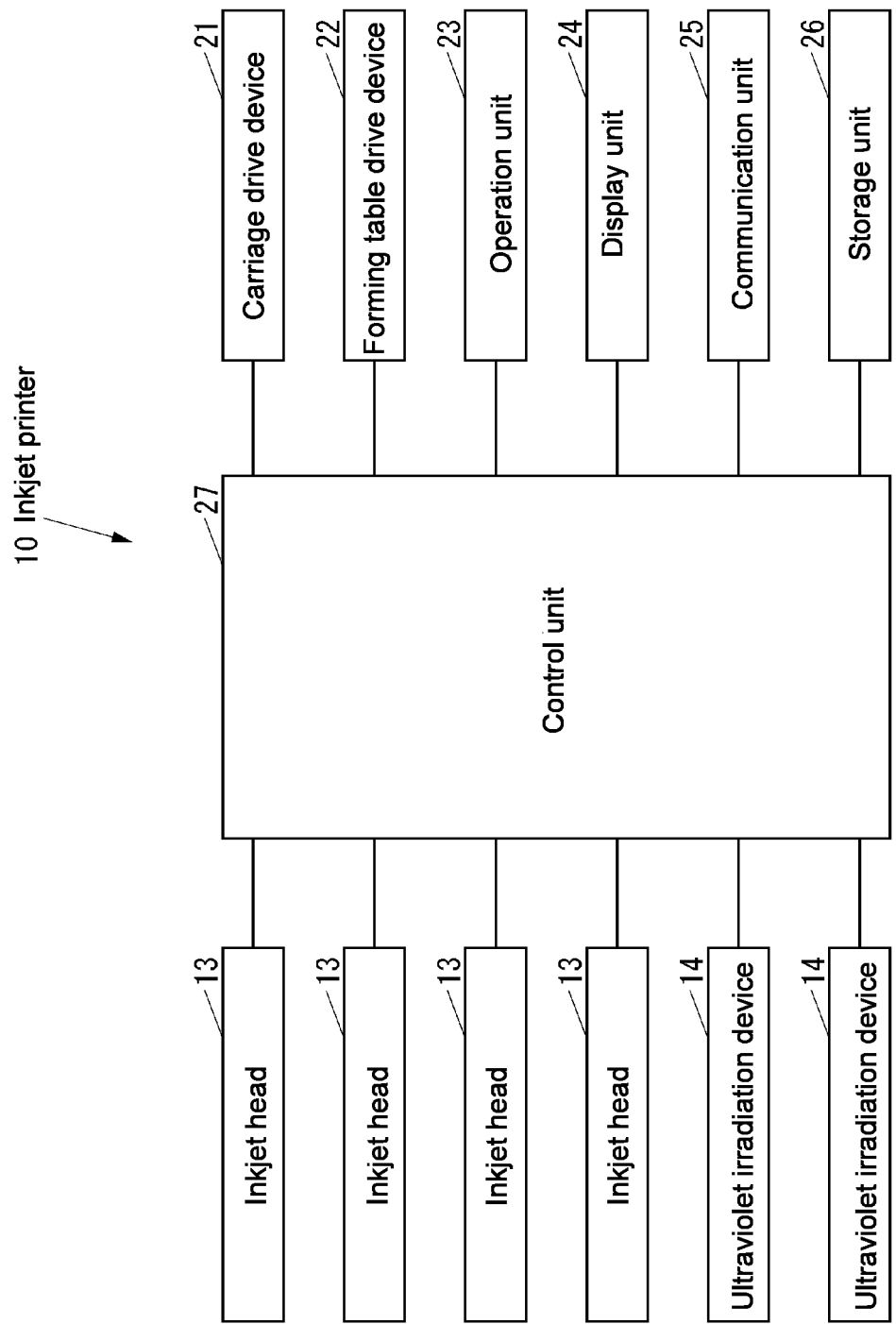
FIG. 2 is a block diagram of the inkjet printer illustrated in FIG. 1.

FIG. 2 is a block diagram of the inkjet printer 10.

As illustrated in FIG. 2, the inkjet printer 10 further has a carriage drive device 21, a forming table drive device 22, an operation unit 23, a display unit 24, a communication unit 25, a storage unit 26, and a control unit 27. The carriage drive device 21 moves the carriage 12 (see FIG. 1) in a direction illustrated with an arrow 10b (see FIG. 1) orthogonal to a vertical direction illustrated with the arrow 10a (see FIG. 1) and also moves the carriage 12 in a direction illustrated with an arrow 10c (see FIG. 1) orthogonal to the vertical direction and the direction illustrated with the arrow 10b. The forming table drive device 22 moves the forming table 11 (see FIG. 1) in the vertical direction. An example of the operation unit 23 is an input device including buttons through which various operational instructions are input. An example of the display unit 24 is a liquid crystal display (LCD) device that displays thereon various pieces of information. The communication unit 25 is a device for communicating with external devices. An example of the storage unit 26 is a hard disc drive (HDD) in which various kinds of data are stored. The control unit 27 controls the whole inkjet printer 10.

The control unit 27 includes a CPU (central processing unit), a ROM (read-only memory) in which programs and various data are prestored (stored in advance), and a RAM (random access memory) used as the CPU's working region. The CPU is configured to run the programs stored in the ROM or storage unit 26.

Next, operation of the inkjet printer 10 is described.

The control unit 27 of the inkjet printer 10 drives the carriage drive device 21 and the forming table drive device 22 based on printing data input via the communication unit 25 to change the relative position of the carriage 12 with respect to the forming table 11. The control unit 27 also drives, based on the printing data, the inkjet heads 13 and the ultraviolet irradiation devices 14 that are both mounted in the carriage 12, so that ink droplets are discharged on the forming table 11 from the inkjet heads 13 and cured by ultraviolet light emitted from the ultraviolet irradiation devices 14. The control unit 27 is thus configured to manufacture a three-dimensional object on the forming table 11 in accordance with the printing data.

Next, an inkjet forming method carried out as instructed by the printing data is described.

Figure 3A:
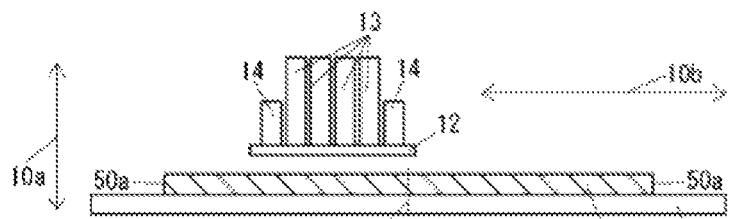
FIG. 3A is a schematic front view of the inkjet printer of FIG. 1, illustrating an inkjet forming method carried out as instructed by printing data.
Figure 3B:
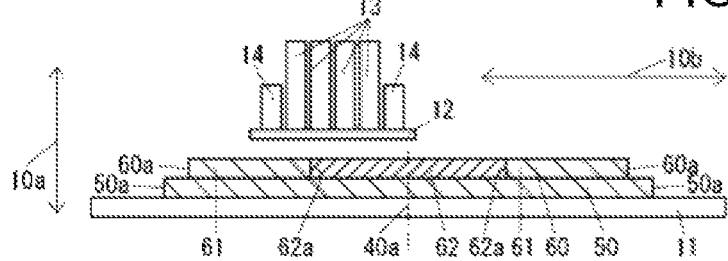
FIG. 3B is a schematic front view of the inkjet printer during a step performed subsequent to a step illustrated in FIG. 3A.
Figure 3C:
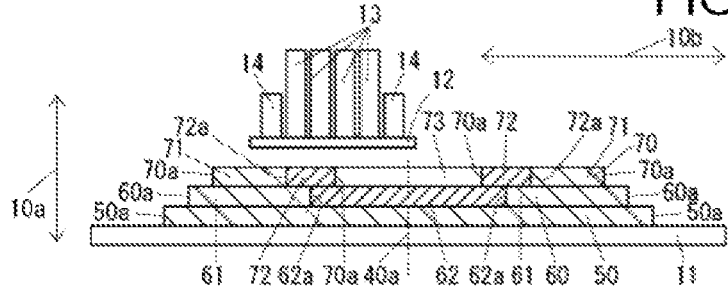
FIG. 3C is a schematic front view of the inkjet printer during a step performed subsequent to the step illustrated in FIG. 3B.
Figure 3D:
FIG. 3D is a schematic front view of the inkjet printer during a step performed subsequent to the step illustrated in FIG. 3C.

FIG. 3A is a schematic front view of the inkjet printer 10, illustrating the inkjet forming method carried out as instructed by the printing data. FIG. 3B is a schematic front view of the inkjet printer 10 during a step performed subsequent to a step illustrated in FIG. 3A. FIG. 3C is a schematic front view of the inkjet printer 10 during a step performed subsequent to the step illustrated in FIG. 3B. FIG. 3D is a schematic front view of the inkjet printer 10 during a step performed subsequent to the step illustrated in FIG. 3C.

In FIGS. 3A to 3D, layers formed by the inkjet printer 10 are illustrated in cross section. The layers really present a body of rotation centered on a central axis 40a extending in the vertical direction 10a.

As illustrated in FIG. 3A, the control unit 27 of the inkjet printer 10 prompts the inkjet discharge of ink droplets from the inkjet heads 13 and thereby forms a horizontally extending layer 50.

After the layer 50 is formed as illustrated in FIG. 3A, the control unit 27 drives the forming table drive device 22 to draw the forming table 11 and the carriage 12 away from each other. Then, as illustrated in FIG. 3B, the control unit 27 prompts the inkjet discharge of ink droplets from the inkjet heads 13 and thereby forms a horizontally extending layer 60 on the layer 50. The control unit 27 thus forms the layers 50 and 60 in stacked configuration in the vertical direction 10a.

The control unit 27 forms the layer 60 in a manner that the entirety of the layer 60 and the entirety of a contour 60a of the layer 60 in the horizontal direction are vertically contiguous with an inner part of the layer 50 immediately below and contiguous with the layer 60 in the vertical direction 10*a*, the inner part of the layer 50 being located inward of a contour 50*a* of the layer 50 in the horizontal direction.

The layer 60 includes a region 61 formed in a horizontal end part thereof, and a region 62 formed on the center side of the layer 60 relative to the region 61 in the horizontal direction. The region 61 is formed from the same ink as that of the layer 50. The region 62 is formed from an ink different from that of the region 61.

After the layer 60 is formed as illustrated in FIG. 3B, the control unit 27 drives the forming table drive device 22 to draw the forming table 11 and the carriage 12 away from each other. Then, as illustrated in FIG. 3C, the control unit 27 prompts the inkjet discharge of ink droplets from the inkjet heads 13 and thereby forms a horizontally extending layer 70 on the layer 60. The control unit 27 thus forms the layers 60 and 70 in stacked configuration in the vertical direction 10*a*.

The control unit 27 forms the layer 70 in a manner that the entirety of the layer 70 and the entirety of a contour 70*a* of the layer 70 in the horizontal direction are vertically contiguous with an inner part of the layer 60 immediately below and contiguous with the layer 70 in the vertical direction 10*a*, the inner part of the layer 60 being located inward of the contour 60*a* of the layer 60 in the horizontal direction.

The layer 70 includes a region 71 formed in a horizontal end part thereof, and a region 72 formed on the center side of the layer 70 relative to the region 71 in the horizontal direction. A region 73 formed on the center side of the layer 70 relative to the region 72 in the horizontal direction is a space that is not a part of the layer 70. The region 71 is formed from the same ink as that of the layer 50 and the region 61 of the layer 60. The region 72 is formed from the same ink as that of the region 62 of the layer 60.

The region 72 is partly contiguous with a part of the region 62 in the vertical direction 10*a*. The rest of the region 72 is not contiguous with a part of the region 62 in the vertical direction but is contiguous with a part of the region 61 in the vertical direction. Thus, it is not possible to correctly position the region 72 unless the region 62 formed from the same ink and the region 61 formed from a different ink are present therebelow.

After the layer 70 is formed as illustrated in FIG. 3C, the control unit 27 drives the forming table drive device 22 to draw the forming table 11 and the carriage 12 away from each other. Then, as illustrated in FIG. 3D, the control unit 27 prompts the inkjet discharge of ink droplets from the inkjet heads 13 and thereby forms a horizontally extending layer 80 on the layer 70. The control unit 27 thus forms the layers 70 and 80 in stacked configuration in the vertical direction 10*a*.

The control unit 27 forms the layer 80 in a manner that the entirety of the layer 80 and the entirety of a contour 80*a* of the layer 80 in the horizontal direction are vertically contiguous with an inner part of the layer 70 immediately below the layer 80 in the vertical direction 10*a*, the inner part of the layer 50 being located inward of the contour 70*a* of the layer 70 in the horizontal direction.

The layer 80 includes a region 81 formed in a horizontal end part thereof, and a region 82 formed on the center side of the layer 80 relative to the region 81 in the horizontal direction. A region 83 formed on the center side of the layer 80 relative to the region 82 in the horizontal direction is a space that is not a part of the layer 80. The region 81 is formed from the same ink as that of the layer 50, the region 61 of the layer 60, and the region 71 of the layer 70. The region 82 is formed from the same ink as that of the region 62 of the layer 60 and the region 72 of the layer 70.

The region 82 is partly contiguous with a part of the region 72 in the vertical direction 10*a*. The rest of the region 82 is not contiguous with a part of the region 72 in the vertical direction 10*a* but is contiguous with a part of the region 71 in the vertical direction. Thus, it is not possible to correctly position the region 82 unless the region 72 formed from the same ink and the region 71 formed from a different ink are present therebelow.

Figure 4A:
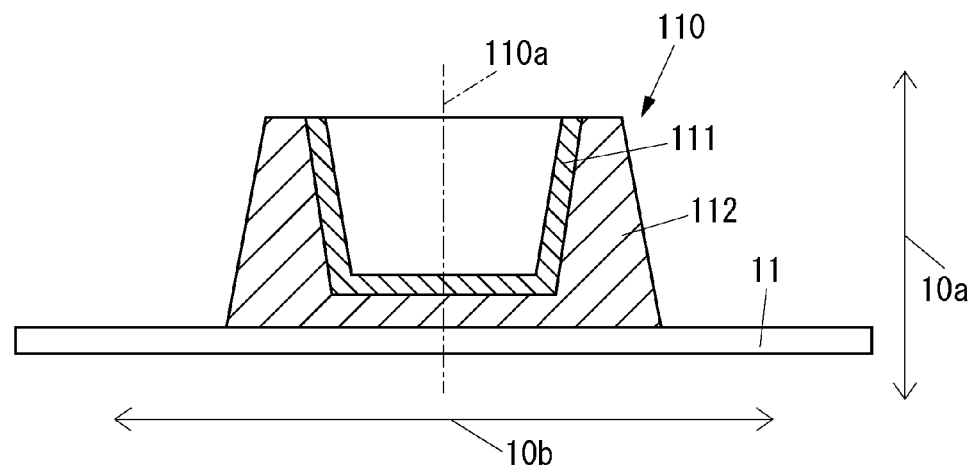
FIG. 4A is a front view in cross section of a three-dimensional object manufactured on a forming table by the inkjet printer of FIG. 1 based on printing data.
Figure 4B:
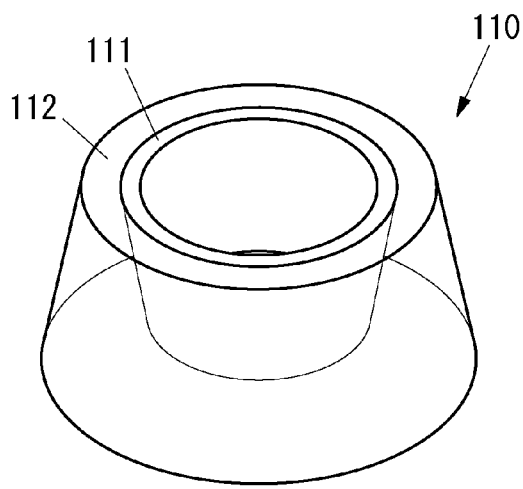
FIG. 4B is a perspective view of the three-dimensional object illustrated in FIG. 4A detached from the forming table.
Figure 4C:
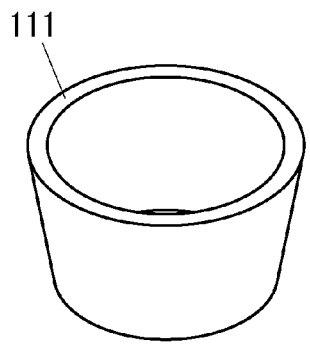
FIG. 4C is a perspective view of a target object obtained from the three-dimensional object illustrated in FIG. 4B.

FIG. 4A is a front view in cross section of a three-dimensional object 110 manufactured on the forming table 11 by the inkjet printer 10 based on the printing data. FIG. 4B is a perspective view of the three-dimensional object 110 detached from the forming table 11. FIG. 4C is a perspective view of a target object 111 obtained from the three-dimensional object 110.

In FIG. 4A, the three-dimensional object 110 manufactured by the inkjet printer 10 is illustrated in cross section. The three-dimensional object 110 is really a body of rotation centered on a central axis 110*a* extending in the vertical direction 10*a*.

The three-dimensional object 110 illustrated in FIG. 4A is manufactured in steps similar to the ones illustrated in FIG. 3. The three-dimensional object 110 includes a target object 111, and a removable portion 112 contiguous with the target object 111 to be removed after the three-dimensional object 110 is manufactured. The removable portion 112, if described referring to the steps illustrated in FIGS. 3A to 3D, is constituted by the layer 50, the region 61 of the layer 60, the region 71 of the layer 70, and the region 81 of the layer 80. The removable portion 112 is formed from an ink that can be stripped off with a certain liquid, for example, water. The target object 111, if described referring to the steps illustrated in FIGS. 3A to 3D, is constituted by the region 62 of the layer 60, the region 72 of the layer 70, and the region 82 of the layer 80.

In FIG. 4B, the removable portion 112 is illustrated as a transparent portion for easier visualization of this disclosure. The removable portion 112, which will be ultimately removed, may not necessarily be transparent but may be instead a colored portion.

In the three-dimensional object 110, at least a partial contour of the target object 111 in the horizontal direction in any one of the layers is contiguous with the removable portion 112 in the layer, and is vertically contiguous with the target object 111 in another one of the layers immediately above and contiguous with the layer in the vertical direction 10*a*. For instance, the contour 62*a* of the region 62 in the layer 60 (see FIG. 3C), constituting the target object 111, in the horizontal direction is contiguous with the region 61 in the layer 60, constituting the removable portion 112. The contour 62*a* is further vertically contiguous with the region 72 in the layer 70, constituting the target object 111, immediately above and vertically contiguous with the layer 60. For instance, a contour 72*a* of the region 72 in the layer 70, constituting the target object 111 (see FIG. 3D), in the horizontal direction is at least partly contiguous with the region 71 in the layer 70, constituting the removable portion 112, and also vertically contiguous with the region 82 in the layer 80, constituting the target object 111, immediately above and vertically contiguous with the layer 70.

At least a part of the removable portion 112 of the three-dimensional object 110 forms at least a partial contour of any one of the layers in the horizontal direction. For instance, the region 61, part of the removable portion 112, form is the contour 60*a* of the layer 60 in the horizontal direction. The region 71, part of the removable portion 112, forms a part of the contour 70a of the layer 70 in the horizontal direction on the opposite side of the region 72.

The inkjet forming method carried out as instructed by the printing data forms a target layer in a manner that the entirety of the target layer and the entire contour of the target layer in the horizontal direction are vertically contiguous with an inner part of an immediate underlayer of the target layer in the vertical direction 10a, the inner part of the immediate underlayer being located inward of the contour of the immediate underlayer in the horizontal direction. In a region of the target object 111 in which the vertically upper side of the target object 111 overhangs the vertically lower side in the vertical direction, therefore, the removable portion in each of the layers has an outer wall in which vertically lower ones of the layers consistently project more outward than vertically upper ones of the layers in the vertical direction. None of the parts of the three-dimensional object 110 on any surfaces but the surfaces orthogonal to the vertical direction extends in the vertical direction. Further, none of the upper-side parts of the three-dimensional object 110 in the vertical direction overhangs its lower-side parts.

The three-dimensional object 110 manufactured as illustrated in FIG. 4A is detached from the forming table 11 as illustrated in FIG. 4B. Then, the removable portion 112 is removed from the three-dimensional object 110 with a certain liquid such as water. As a result, the target object 111 illustrated in FIG. 4C is obtained.

The inkjet printer 10 is operable to manufacture variously different three-dimensional objects as well as the three-dimensional object 110 illustrated in FIGS. 4A to 4C.

Figure 5A:
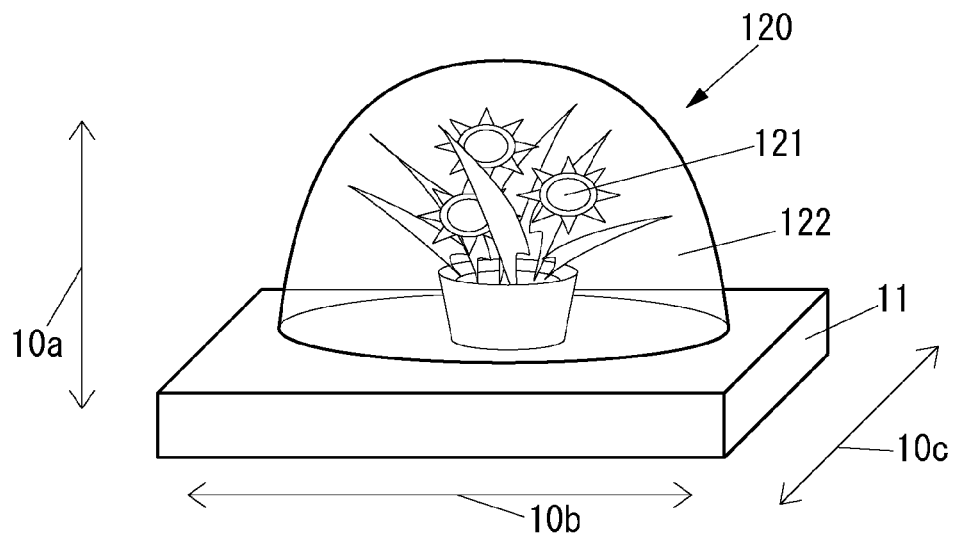
FIG. 5A is a perspective view of a three-dimensional object manufactured on the forming table by the inkjet printer of FIG. 1 based on printing data, illustrating an example different from the three-dimensional object of FIG. 4.
Figure 5B:
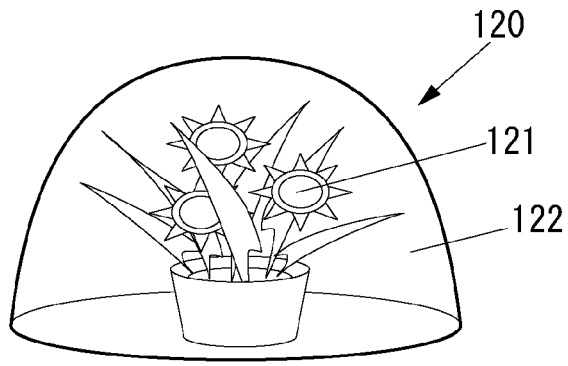
FIG. 5B is a perspective view of the three-dimensional object of FIG. 5A detached from the forming table.
Figure 5C:
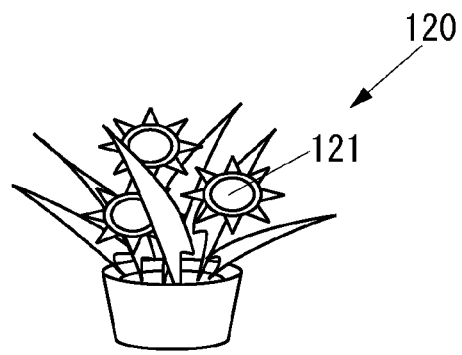
FIG. 5C is a perspective view of a target object obtained from the three-dimensional object illustrated in FIG. 5B.
Figure 6A:
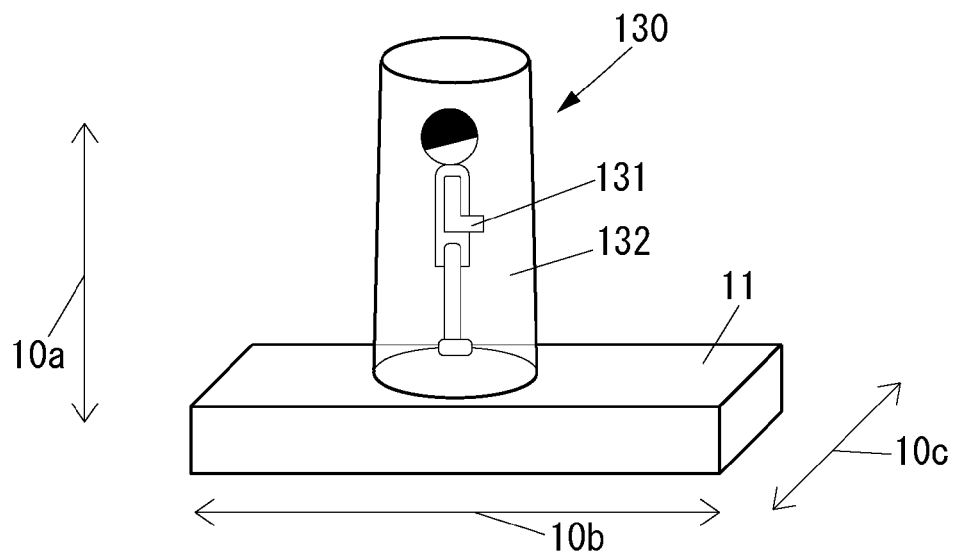
FIG. 6A is a perspective view of a three-dimensional object manufactured on the forming table by the inkjet printer of FIG. 1 based on printing data, illustrating an example different from the three-dimensional objects of FIGS. 4 and 5.
Figure 6B:
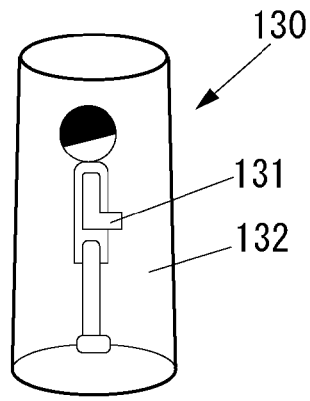
FIG. 6B is a perspective view of the three-dimensional object of FIG. 6A detached from the forming table.

For instance, examples of other three-dimensional objects manufacturable by the inkjet printer 10 may include a three-dimensional object 120 illustrated in FIGS. 5A to 5C and a three-dimensional object 130 illustrated in FIGS. 6A and 6B.

FIG. 5A is a perspective view of the three-dimensional object 120 manufactured on the forming table 11 by the inkjet printer 10 based on printing data. FIG. 5B is a perspective view of the three-dimensional object 120 detached from the forming table 11. FIG. 5C is a perspective view of a target object 121 obtained from the three-dimensional object 120.

The three-dimensional object 120 illustrated in FIG. 5A includes a target object 121, and a removable portion 122 contiguous with the target object 121 to be removed after the three-dimensional object 120 is manufactured. The target object 121 is a model of potted flowers. Three-dimensional data based on which the target object 121 is formed may be generated from photographs of real potted flowers taken with a camera in different directions. The removable portion 122 is a dome-shaped portion in which circles in cross section along horizontal planes have smaller diameters toward the upper side in the vertical direction 10a.

In FIGS. 5A to 5C, the removable portion 122 is illustrated as a transparent portion for easier visualization of this disclosure. The removable portion 122, which will be ultimately removed, may not necessarily be transparent but may be instead a colored portion. The removable portion 122 is formed from an ink that can be stripped off with a certain liquid, for example, water.

In the three-dimensional object 120, at least a partial contour of the target object 121 in the horizontal direction in any one of the layers is contiguous with the removable portion 122 in the layer, and is vertically contiguous with the target object 121 in another one of the layers immediately above and contiguous with the layer in the vertical direction 10a. At least a part of the removable portion 122 of the three-dimensional object 120 forms at least a partial contour of any one of the layers in the horizontal direction. None of the parts of the three-dimensional object 120 on any surfaces but the surfaces orthogonal to the vertical direction extends in the vertical direction. Further, none of the upper-side parts of the three-dimensional object 120 in the vertical direction overhangs its lower-side parts.

The three-dimensional object 120 manufactured as illustrated in FIG. 5A is detached from the forming table 11 as illustrated in FIG. 5B. Then, the removable portion 122 is removed from the three-dimensional object 120 with a certain liquid such as water. As a result, the target object 121 illustrated in FIG. 5C is obtained.

Optionally, an inkjet forming system may be provided, in which a sequence of whole steps, ranging from taking photographs of a real target object using a camera to manufacturing of a three-dimensional object or detachment of a target object from the manufactured three-dimensional object, are computerized and automated. The inkjet forming system may be further equipped to collect charges of a series of services.

Figure 6C:
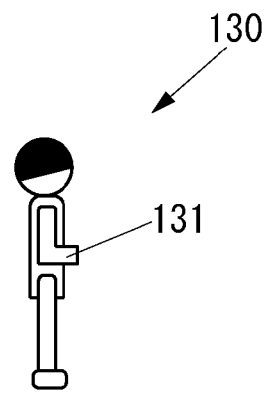
FIG. 6C is a perspective view of a target object obtained from the three-dimensional object illustrated in FIG. 6B.

FIG. 6A is a perspective view of the three-dimensional object 130 manufactured on the forming table 11 by the inkjet printer 10 based on printing data. FIG. 6B is a perspective view of the three-dimensional object 130 detached from the forming table 11. FIG. 6C is a perspective view of a target object 131 obtained from the three-dimensional object 130.

The three-dimensional object 130 illustrated in FIG. 6A includes the target object 131, and a removable portion 132 contiguous with the target object 131 to be removed after the three-dimensional object 130 is manufactured. The target object 131 is a model of a person's whole body. Three-dimensional data based on which the target object 131 is formed may be generated from photographs of a real person taken with a camera in different directions. The removable portion 132 is a truncated cone-shaped portion in which circles in cross section along horizontal planes have smaller diameters toward the upper side in the vertical direction 10a.

In FIGS. 6A to 6C, the removable portion 132 is illustrated as a transparent portion for easier visualization of this disclosure. The removable portion 132, which will be ultimately removed, may not necessarily be transparent but may be instead a colored portion. The removable portion 132 is formed from an ink that can be stripped off with a certain liquid, for example, water.

In the three-dimensional object 130, at least a partial contour of the target object 131 in the horizontal direction in any one of the layers is contiguous with the removable portion 132 in the layer, and is vertically contiguous with the target object 131 in another one of the layers immediately above and contiguous with the layer in the vertical direction 10a. At least a part of the removable portion 132 of the three-dimensional object 130 forms at least a partial contour of any one of the layers in the horizontal direction. None of the parts of the three-dimensional object 130 on any surfaces but the surfaces orthogonal to the vertical direction extends in the vertical direction. Further, none of the upper-side parts of the three-dimensional object 130 in the vertical direction overhangs its lower-side parts.

The three-dimensional object 130 manufactured as illustrated in FIG. 6A is detached from the forming table 11 as illustrated in FIG. 6B. Then, the removable portion 132 is removed from the three-dimensional object 130 with a certain liquid such as water. As a result, the target object 131 illustrated in FIG. 6C is obtained.

The inkjet forming method according to this embodiment, as described so far, forms a target layer in a manner that the entirety of the target layer and the entire contour of the target layer in the horizontal direction are vertically contiguous with an inner part of an immediate underlayer of the target layer in the vertical direction 10a, the inner part of the immediate underlayer being located inward of the contour of the immediate underlayer in the horizontal direction. The inkjet forming method according to this embodiment form is the layers so as to have vertically lower ones of the layers constituting the outer wall of the removable portion consistently project more outward than vertically upper ones of the layers in the overhang region of the target object. In case ink droplets discharged to form a target layer fail to land on a target position in the horizontal direction, the inkjet forming method according to this embodiment may prevent that the ink droplets discharged to form the contour of the target layer in the horizontal direction does not land on another layer immediately below the target layer but falls vertically further downward. The inkjet forming method according to this embodiment may improve the shape accuracy of a three-dimensional object to be formed as compared to the conventional forming methods.

According to an experiment conducted by the inventors, a gradient defined by an end part that forms a contour in the horizontal direction of a target layer and an end part that forms a contour in the horizontal direction of another layer immediately above and contiguous with the target layer in the vertical direction 10a may preferably be calculated from a horizontal distance and a vertical distance equal to or less than 100-fold of the horizontal distance.

Figure 7:
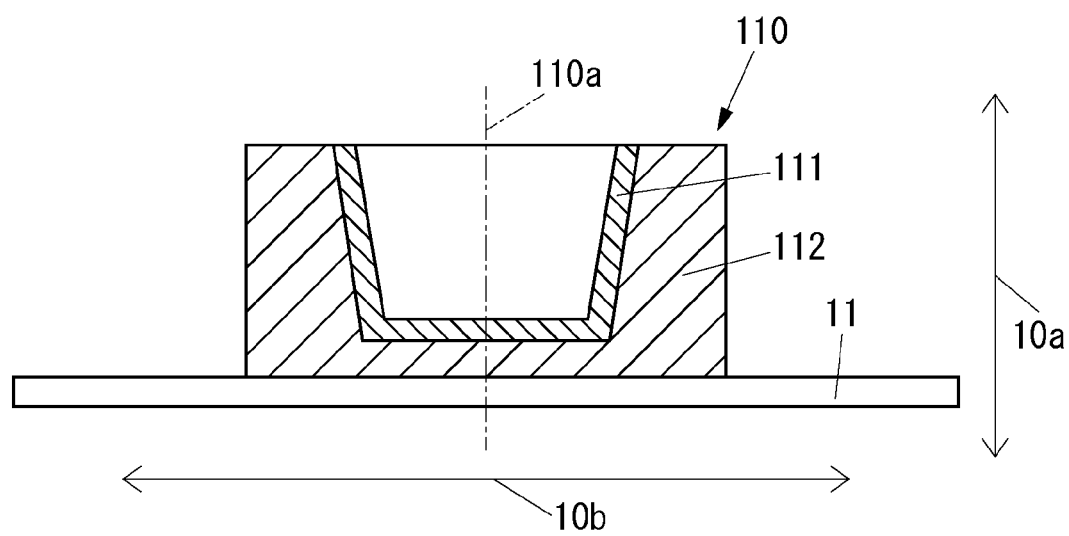
FIG. 7 is a drawing of a modified example of the three-dimensional object illustrated in FIG. 4A.

In order to secure a distance large enough between the target object 111 and the end surface of the three-dimensional object 110 of FIG. 4A in the horizontal direction, the end surface of the three-dimensional object 110 in the horizontal direction may be extended in the vertical direction 10a, instead of vertically changing the dimensions of the lowermost surface of the object 110, as illustrated in FIG. 7. This approach may prevent that the shape of the target object 111 is adversely affected by slight shape errors, if any, in the end surface of the three-dimensional object 110 in the horizontal direction. The method illustrated in FIG. 4A decreases the volume of the removable portion 112 as compared to the method illustrated in FIG. 7, reducing ink consumption for the removable portion 112. The method illustrated in FIG. 4A forms the vertically uppermost surface in a smaller area than the vertically lowermost surface. According to this method, therefore, the three-dimensional object 110 may be unlikely to fall over and thus improved in stability as compared to the method illustrated in FIG. 7.

The inkjet forming method according to this embodiment may improve the shape accuracy of three-dimensional objects to be formed as compared to the conventional methods. After the removable portion is removed from the three-dimensional object formed by this method, a target object obtained then may be very accurate in shape.

As thus far described, the three-dimensional object includes the removable portion formed in contiguity with the target object and removed after the three-dimensional object is manufactured. In place of the removable portion to be later removed, the three-dimensional object may include a transparent portion contiguous with the target object. The transparent portion is formed from a transparent ink.

In case the target object 121 of the three-dimensional object 120 of FIG. 5B is partly too thin and/or too narrow to be mechanically strong enough, the target object 121, if enclosed by the transparent portion in place of the removable portion 122 to be later removed, may be thereby well-protected. In case the three-dimensional object 120 of FIG. 5B having the transparent portion, in place of the removable portion 122, is accidentally damaged or soiled on its surface, the object 120 may be easily repaired by removing the damaged or soiled parts and smoothing the surface.

The target object 131 illustrated in FIG. 6C may be difficult to stand on its own. In the three-dimensional object 130 of FIG. 6B, on the other hand, the target object 131 is enclosed by a truncated cone-shaped, transparent portion having a large bottom surface used in place of the removable portion 132. This target object 131 may be usable as, for example, a self-standing, tabletop ornament. In case the three-dimensional object 130 of FIG. 6B having the transparent portion, in place of the removable portion 132, is accidentally damaged or soiled on its surface, the object 130 may be easily repaired by removing the damaged or soiled part and smoothing the surface.

Figure 8A:
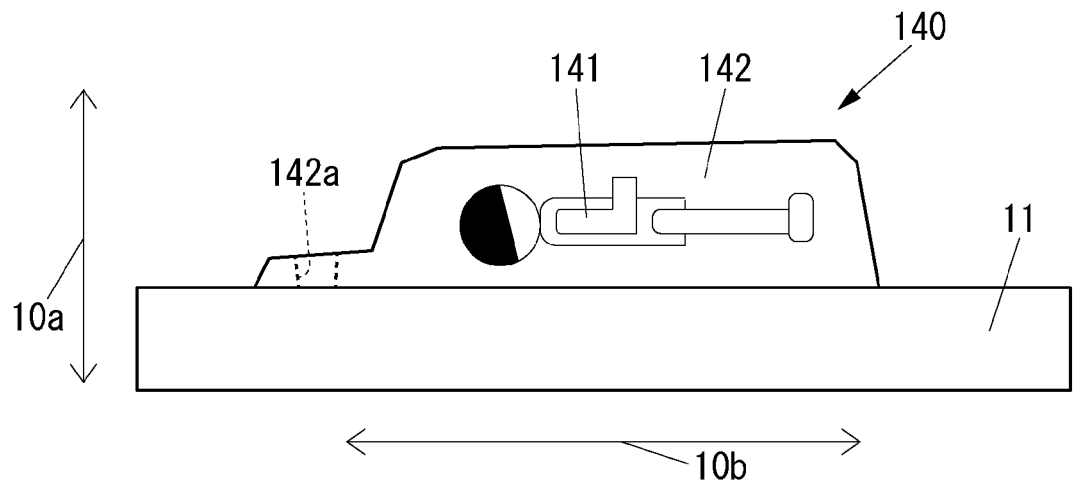
FIG. 8A is a side view of a three-dimensional object manufactured on the forming table by the inkjet printer of FIG. 1 based on printing data, illustrating an example different from the three-dimensional objects of FIGS. 4 to 6.
Figure 8B:
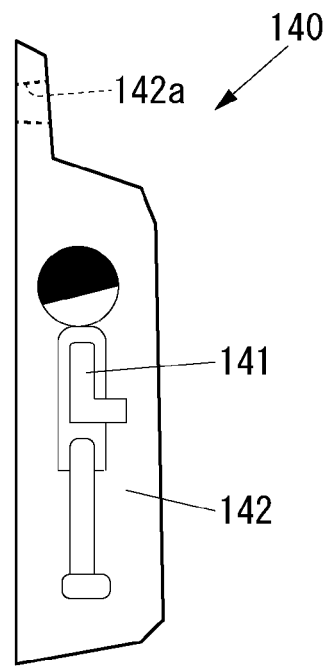
FIG. 8B is a side view of the three-dimensional object of FIG. 8A detached from the forming table.

FIG. 8A is a side view of a three-dimensional object 140 manufactured on the forming table 11 by the inkjet printer 10 based on printing data. FIG. 8B is a perspective view of the three-dimensional object 140 detached from the forming table 11.

The three-dimensional object 140 illustrated in FIG. 8A includes a target object 141, and a transparent portion 142 contiguous with the target object 141. The target object 141 is a model of a person's whole body. Three-dimensional data based on which the target object 141 is formed may be generated from photographs of a real person taken with a camera in different directions. The transparent portion 142 has a shape in which cross sections along horizontal planes are smaller toward the upper side in the vertical direction 10a. The transparent portion 142 has a through hole 142a. The three-dimensional object 140 is attachable to a mobile telephone strap by inserting the strap in the through hole 142a.

In the three-dimensional object 140, at least a partial contour of the target object 141 in the horizontal direction in any one of the layers is contiguous with the transparent portion 142 in the layer, and is vertically contiguous with the target object 141 in another one of the layers immediately above and contiguous with the layer in the vertical direction 10a. At least a part of the transparent portion 142 of the three-dimensional object 140 forms at least a partial contour of any one of the layers in the horizontal direction. None of the parts of the three-dimensional object 140 on any surfaces but the surfaces orthogonal to the vertical direction extends in the vertical direction. Further, none of the upper-side parts of the three-dimensional object 140 in the vertical direction overhangs its lower-side parts. The surfaces other than the surfaces orthogonal to the vertical direction include a surface having the through hole 142a formed therein.

A final three-dimensional product is obtained by simply detaching the three-dimensional object 140 manufactured as illustrated in FIG. 8A from the forming table 11 as illustrated in FIG. 8B. In case the three-dimensional object 140 is accidentally damaged or soiled on its surface, the object 140 may be easily repaired by removing the damaged or soiled parts and smoothing the surface.

Figure 9A:
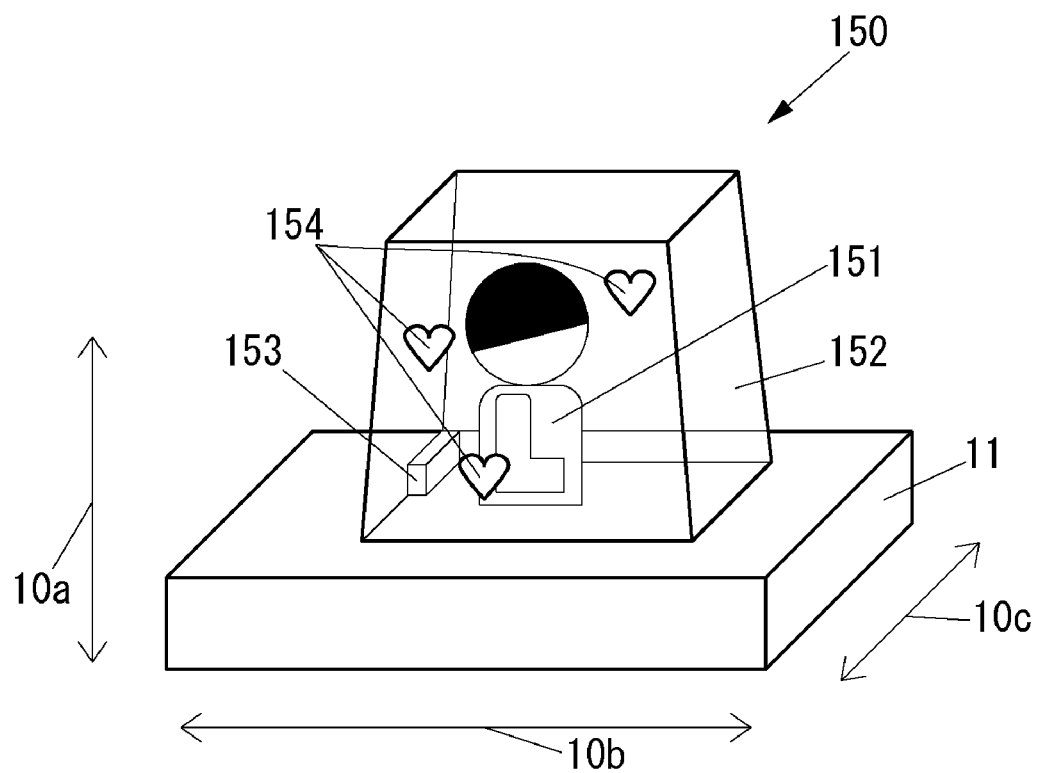
FIG. 9A is a perspective view of a three-dimensional object manufactured on the forming table by the inkjet printer of FIG. 1 based on printing data, illustrating an example different from the three-dimensional objects of FIGS. 4 to 6 and 8.
Figure 9B:
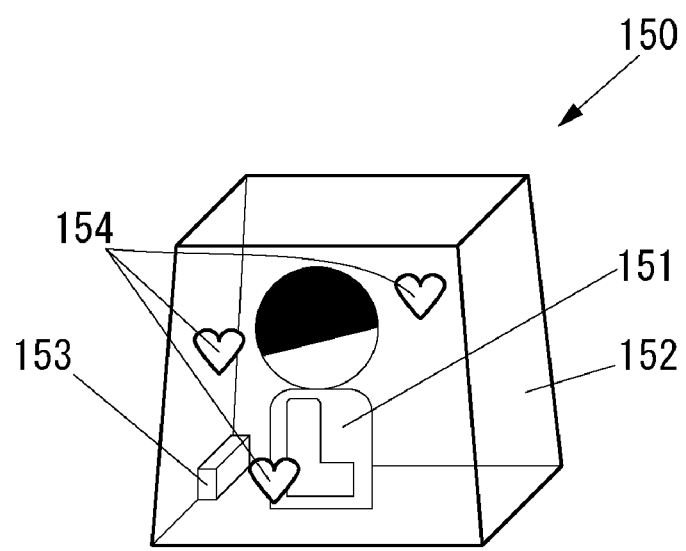
FIG. 9B is a perspective view of the three-dimensional object of FIG. 9A detached from the forming table.

FIG. 9A is a perspective view of a three-dimensional object 150 manufactured on the forming table 11 by the inkjet printer 10 based on printing data. FIG. 9B is a perspective view of the three-dimensional object 150 detached from the forming table 11.

The three-dimensional object 150 illustrated in FIG. 9A includes a target object 151, a transparent portion 152 contiguous with the target object 151, a character/letter area 153 contained in the transparent portion 152 with characters/letters displayed thereon, and a decorative image 154 contained in the transparent portion 152 as decorative ornaments for the target object 151. The target object 151 is a model of a person's upper body. Three-dimensional data based on which the target object 151 is formed may be generated from photographs of a real person taken with a camera in different directions. The transparent portion 152 is a trapezoidal portion in which cross sections along horizontal planes are smaller toward the upper side in the vertical direction 10a.

Examples of characters and/or letters to be input to the character/letter area 153 may include date, name, and place. The decorative image 154 may include a heart mark and other marks, frames that surround the target object 151, and images including semi-transparent images in pale colors.

Taking the inkjet forming system for instance, characters and/or letters input to the character/letter area 153 and types of the decorative image 154 may preferably be optionally selected by a user.

In the three-dimensional object 150, at least a partial contour of the target object 151 in the horizontal direction in any one of the layers is contiguous with the transparent portion 152 in the layer, and is vertically contiguous with the target object 151 in another one of the layers immediately above and contiguous with the layer in the vertical direction 10a. At least a part of the transparent portion 152 of the three-dimensional object 150 forms at least a partial contour of any one of the layers in the horizontal direction. None of the parts of the three-dimensional object 150 on any surfaces but the surfaces orthogonal to the vertical direction extends in the vertical direction. Further, none of the upper-side parts of the three-dimensional object 150 in the vertical direction overhangs its lower-side parts.

A final three-dimensional product is obtained by simply detaching the three-dimensional object 150 manufactured as illustrated in FIG. 9A from the forming table 11 as illustrated in FIG. 9B. In case the three-dimensional object 150 is accidentally damaged or soiled on its surface, the object 150 may be easily repaired by removing the damaged or soiled parts and smoothing the surface.

When the inkjet forming method according to this embodiment forms a three-dimensional object having a transparent portion in place of a removable portion, the labor of removing the removable portion can be dispensed with. As described so far, the inkjet forming method according to this embodiment may improve the shape accuracy of a three-dimensional object to be formed as compared to the conventional forming methods. When the inkjet forming method according to this embodiment forms a three-dimensional object having a transparent portion instead of a removable portion, a highly accurate target object may be easily manufactured.

The inkjet forming method according to this embodiment, when forming a three-dimensional object having a transparent portion instead of a removable portion, can dispense with the labor of removing the removable portion. This inkjet forming method capable of forming such a three-dimensional object is more suitably applicable to the inkjet forming system than any other methods that form three-dimensional objects enclosed by removable portions.

The inkjet printer 10 may change the relative position of the carriage 12 to the forming table 11 in the vertical direction 10a by moving the carriage 12 in the vertical direction 10a using the carriage drive device 21, instead of moving the forming table 11 in the vertical direction 10a using the forming table drive device 22. The inkjet printer 10 may change the relative position of the carriage 12 to the forming table 11 in the direction 10b by moving the forming table 11 in the direction 10b using the forming table drive device 22, instead of moving the carriage 12 in the direction 10b using the carriage drive device 21. The inkjet printer 10 may change the relative position of the carriage 12 to the forming table 11 in the direction 10c by moving the forming table 11 in the direction 10c using the forming table drive device 22, instead of moving the carriage 12 in the direction 10c using the carriage drive device 21.

What is claimed is:

1. An inkjet forming method, which is a three-dimensional object forming method for forming a three-dimensional object in which a target object and a removable portion are integrally formed by vertically stacking a plurality of forming layers in a vertical direction, the inkjet forming method comprising:
   providing an inkjet printer;
   forming each of the forming layers to include a central region by ejecting droplets of a first ink via the inkjet printer;
   forming each of the forming layers to include an end region with respect to the central region by ejecting droplets of a second ink via the inkjet printer; and
   stacking the forming layers in the vertical direction such that adjacently stacked forming layers delineate a gradient and such that a boundary outer contour of the lower forming layer of the adjacently stacked forming layers projects more outward in a horizontal direction than a boundary outer contour of the upper forming layer of the adjacently stacked forming layers,
   wherein the central regions of the vertically stacked forming layers formed the target object,
   wherein the end regions of the vertically stacked forming layers formed the removable portion,
   wherein the gradient is defined by dividing a distance in the vertical direction between the upper surfaces of the adjacently stacked forming layers and a distance in the horizontal direction by which the boundary outer contour of the lower forming layer projects beyond the boundary outer contour of the upper forming layer of the adjacently stacked forming layers, and
   wherein the value of the gradient is set to be equal to or less than 100.

2. The inkjet forming method according to claim 1, wherein the first ink and the second ink are ultraviolet light curable inks.

3. An inkjet forming method, which is a three-dimensional object forming method for forming a three-dimensional object in which a target object and a transparent portion are integrally formed by vertically stacking a plurality of forming layers in a vertical direction, the inkjet forming method comprising:
   providing an inkjet printer;
   forming each of the forming layers to include a central region by ejecting droplets of at least one non-transparent ink via the inkjet printer;
   forming each of the forming layers to include an end region with respect to the central region by ejecting droplets of a transparent ink via the inkjet printer; and
   stacking the forming layers in the vertical direction such that adjacently stacked forming layers delineate a gradient and such that a boundary outer contour of the lower forming layer of the adjacently stacked forming layers projects more outward in a horizontal direction than a boundary outer contour of the upper forming layer of the adjacently stacked forming layers;

wherein the end regions of the vertically stacked forming layers formed the transparent portion,
wherein the central regions of the vertically stacked forming layers formed the target object,
wherein the target object is visually recognized through the transparent portion;
wherein the gradient is defined by dividing a distance in the vertical direction between the upper surfaces of the adjacently stacked forming layers and a distance in the horizontal direction by which the boundary outer contour of the lower forming layer projects beyond the boundary outer contour of the upper forming layer of the adjacently stacked forming layers, and
wherein the value of the gradient is set to be equal to or less than 100.

4. The inkjet forming method according to claim 3, wherein the at least one non-transparent ink and the transparent ink are ultraviolet light curable inks.

\* \* \* \* \*